US008161001B2

(12) United States Patent
Di Carlo et al.

(10) Patent No.: US 8,161,001 B2
(45) Date of Patent: Apr. 17, 2012

(54) RELATIONAL DATABASE PAGE-LEVEL SCHEMA TRANSFORMATIONS

(75) Inventors: Donna M. Di Carlo, Austin, TX (US); Thomas G. Price, Austin, TX (US); Stanely J. Dee, Austin, TX (US)

(73) Assignee: BMC Software, Inc., Houston, TX (US)

( * ) Notice: Subject to any disclaimer, the term of this patent is extended or adjusted under 35 U.S.C. 154(b) by 376 days.

(21) Appl. No.: 12/437,471

(22) Filed: May 7, 2009

(65) Prior Publication Data

US 2010/0287143 A1    Nov. 11, 2010

(51) Int. Cl.
*G06F 17/30* (2006.01)

(52) U.S. Cl. ....................................... 707/602

(58) Field of Classification Search .................. 707/602, 707/999.1, 999.102
See application file for complete search history.

(56) References Cited

U.S. PATENT DOCUMENTS

| 5,611,076 | A | * | 3/1997 | Durflinger et al. | 1/1 |
| 2001/0034822 | A1 | * | 10/2001 | Weinreb et al. | 711/203 |
| 2003/0110205 | A1 | * | 6/2003 | Johnson | 709/104 |
| 2006/0184561 | A1 | * | 8/2006 | Terada | 707/102 |

OTHER PUBLICATIONS

Priti Desai, Migrate your DB2 UDB database from non-partitioned to partitioned environment, Jul. 14, 2005, IBM developer works, http://www.ibm.com/developerworks/data/library/techarticle/dm-0507desai/index.html#ibm-pcon.*

* cited by examiner

*Primary Examiner* — Thu-Nguyet Le

(57) ABSTRACT

Methods, devices and systems which facilitate the conversion of database objects from one schema version (e.g., an earlier version) to another schema version (e.g., a newer version) without requiring the objects be unloaded and reloaded are described. In general, data object conversion applies to both table space objects and index space objects. The described transformation techniques may be used to convert any object whose schema changes occur at the page-level.

15 Claims, 7 Drawing Sheets

RELATIONAL DATABASE PAGE-LEVEL SCHEMA TRANSFORMATIONS

BACKGROUND

The invention relates generally to computer-based database systems and more particularly to methods and devices to perform page-level transformations on relational database objects.

Over the life-span of a commercial database product, schema changes may be introduced. That is, as a database product evolves the range of schema attributes supported by that product naturally grows. Some of these schema changes may necessitate that older database objects (e.g., table spaces and index spaces) be dropped and recreated when being migrated from an older version to a newer version of the database. Dropping and recreating an object causes that object to go off-line, making it unavailable for use during the recreation operation. If the object is large or crucial to a business' operation (such as an order-entry database table and/or an associated index), the time needed to transition the object can be prohibitive. It may not be commercially feasible to take the object off-line long enough to transition it to a newer version.

One type of schema transformations are referred to as "page-level" transformations. In general, page-level schema changes refer to those types of changes that alter pages such as their order and number, but which do not change the length or the business data content of any row. (Purely internal values to a page may be changed however.) Accordingly, page-level schema changes are generally understood not to require that row data be moved from one page to another, even though page numbers and references to a page's internal rows may change. This same description applies to indexes if one uses the term "key entry" instead of "row." Illustrative page-level schema changes that may be made in accordance with the invention include, but are not limited to: increasing page size, increasing data set size, increasing piece size, increasing row ID (RID) size, changing segment size and changing the compression attribute of an index.

Consider the case where a large database object is running up to a fixed limit in an older version of a relational database management system (RDBMS)—e.g., DB2®. (DB2 is a registered trademark of International Business Machines Corporation.) In order to continue using the object, it must be converted into an object that can be used in a newer version of the RDBMS, where the newer version of the RDBMS permits the object to have a larger data set size. In prior art approaches, this would have required the original (aka "source") data object to be taken off-line so that it could be dropped, unloaded, recreated in accordance with the new schema and reloaded. In accordance with the invention, however, page-level schema changes may be made through a transformation process rather than unloading and reloading, a difference that significantly reduces the amount of time the object is taken off-line.

SUMMARY

In one embodiment the invention provides a method to transform a relational database object (a table space object or a index space object) from a first version to a second version based on specified page-level schema changes. The method begins by making a copy of the source object (i.e., the first version of the object), then generates a transformation table by reviewing each page in the source object copy to determine how that page would change (i.e., its location and internal references) as it is transformed into the target object (i.e., the second version of the object) because of the specified page-level schema changes. Once the transformation table is complete, data from the source object copy may be moved into a target object.

In another embodiment, the act of creating a transformation table may be avoiding. Instead, data from the source object may be retained in memory until it is determined how that page changes in toto at which point it may be written to the target object. In yet another embodiment, methods in accordance with the invention may be embodied in one or more computer program modules and stored in any media that is readable and executable by a programmable control device. In still another embodiment, the invention may be implemented using one or more computer systems acting independently or cooperatively (e.g., communicatively coupled through a communications network).

DETAILED DESCRIPTION

Methods, apparatus and program storage devices in accordance with various embodiments of the invention permit page-level schema changes to be made to relational database objects (e.g., table spaces and index spaces) without requiring those objects to be unloaded and reloaded. This can permit database objects to be transformed from a first type (e.g., non-partitioned to partitioned in generic terms or simple to partitioned in DB2 terminology).

The following descriptions are presented to enable any person skilled in the art to make and use the invention as claimed and are provided in the context of the particular examples discussed below, variations of which will be readily apparent to those skilled in the art. In the interest of clarity, not all features of an actual implementation are described in this specification. It will of course be appreciated that in the development of any such actual implementation (as in any software development project), numerous programming decisions must be made to achieve the developers' specific goals (e.g., compliance with system- and business-related constraints), and that these goals will vary from one implementation to another. It will be appreciated that such development effort might be complex and time-consuming, but would nevertheless be a routine undertaking of database system administration for those of ordinary skill having the benefit of this disclosure.

Figure 1:
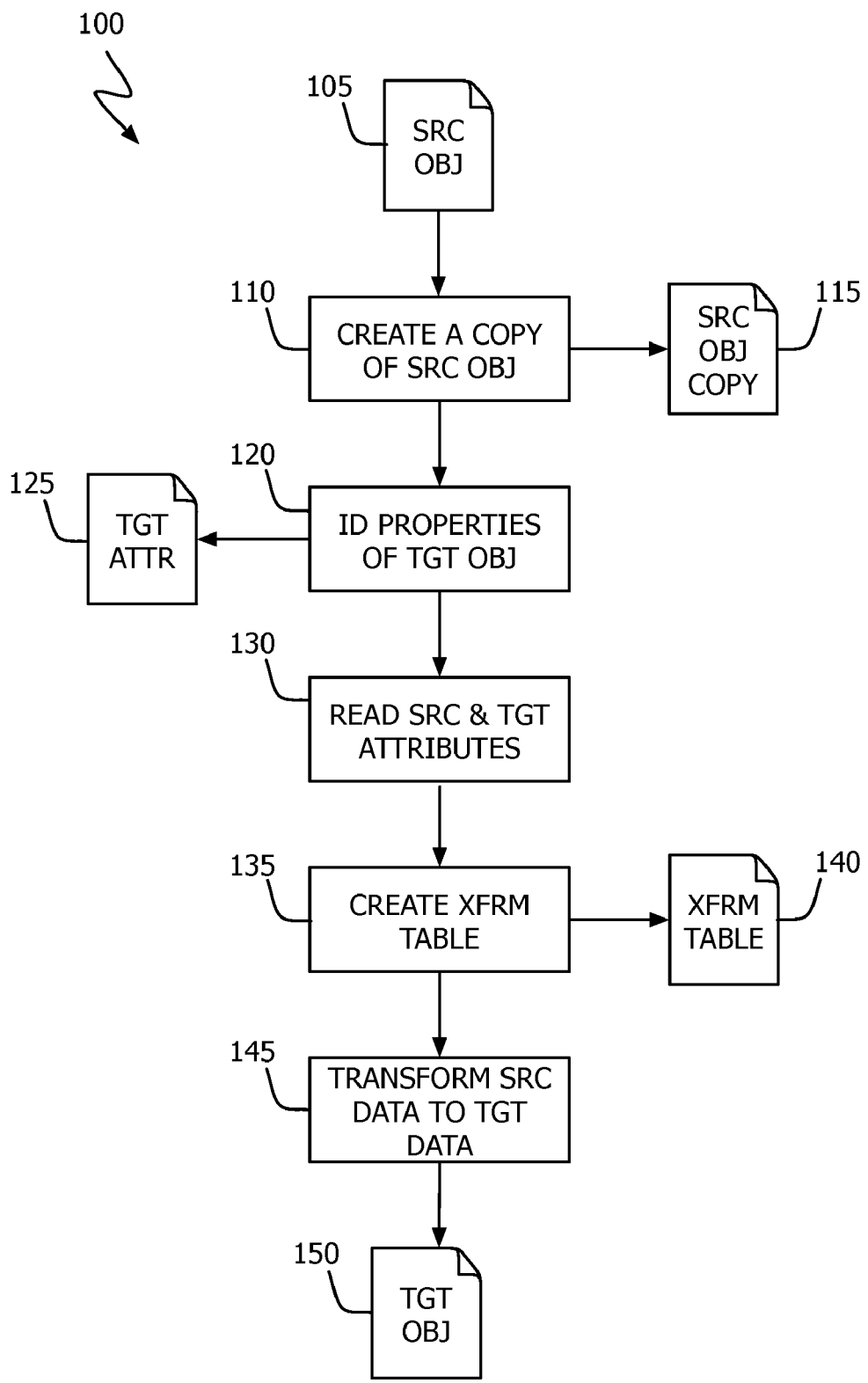
FIG. 1 shows, in flowchart form, a database object transformation method in accordance with one embodiment of the invention.

Referring to FIG. 1, database object transformation method 100 in accordance with one embodiment of the invention begins with source object 105 (e.g., a table space or index space) and creates a copy of the object (block 110) to produce source object copy 115. In general, source object copy 115 may be generated using any suitable database copy utility such as, for example, BMC COPY PLUS for DB2 or BMC RECOVER PLUS for DB2 both sold by BMC Software, Inc. or DB2 DSN1COPY. In a current embodiment, source object copy 115 is a consistent copy made in a manner that does not interrupt user access to source object 105. If user access to source object 105 during transformation operations is not mandatory, or some outage may be tolerated, or a consistent copy is not needed, other copy utilities may be used. Properties or attributes of the new object are then identified (block 120), with those attributes being recorded in a suitable manner (e.g., in target object schema 125). For example, a user may specify the schema for the target object from scratch— identifying each column, its name and attribute by hand (through any suitable tool). Alternatively, a user may use a tool to duplicate the schema of source object 105, editing only those columns/attributes they wish to change. In still another approach, a user could create a new object of the same type as source object 105, accepting the RDBMS' default schema values and edit those attributes they wish to change.

Source and target object attributes may then be read (block 130) to determine what changes need to be made to move data from the source object schema to the target object schema and transformation table 140 generated (block 135). Once transformation table 140 is created, its entries may be used to move data from source object copy 115 to target object 150 (block 145)—thereby implementing the transformation of data from source object schema to target object schema.

Figure 2:
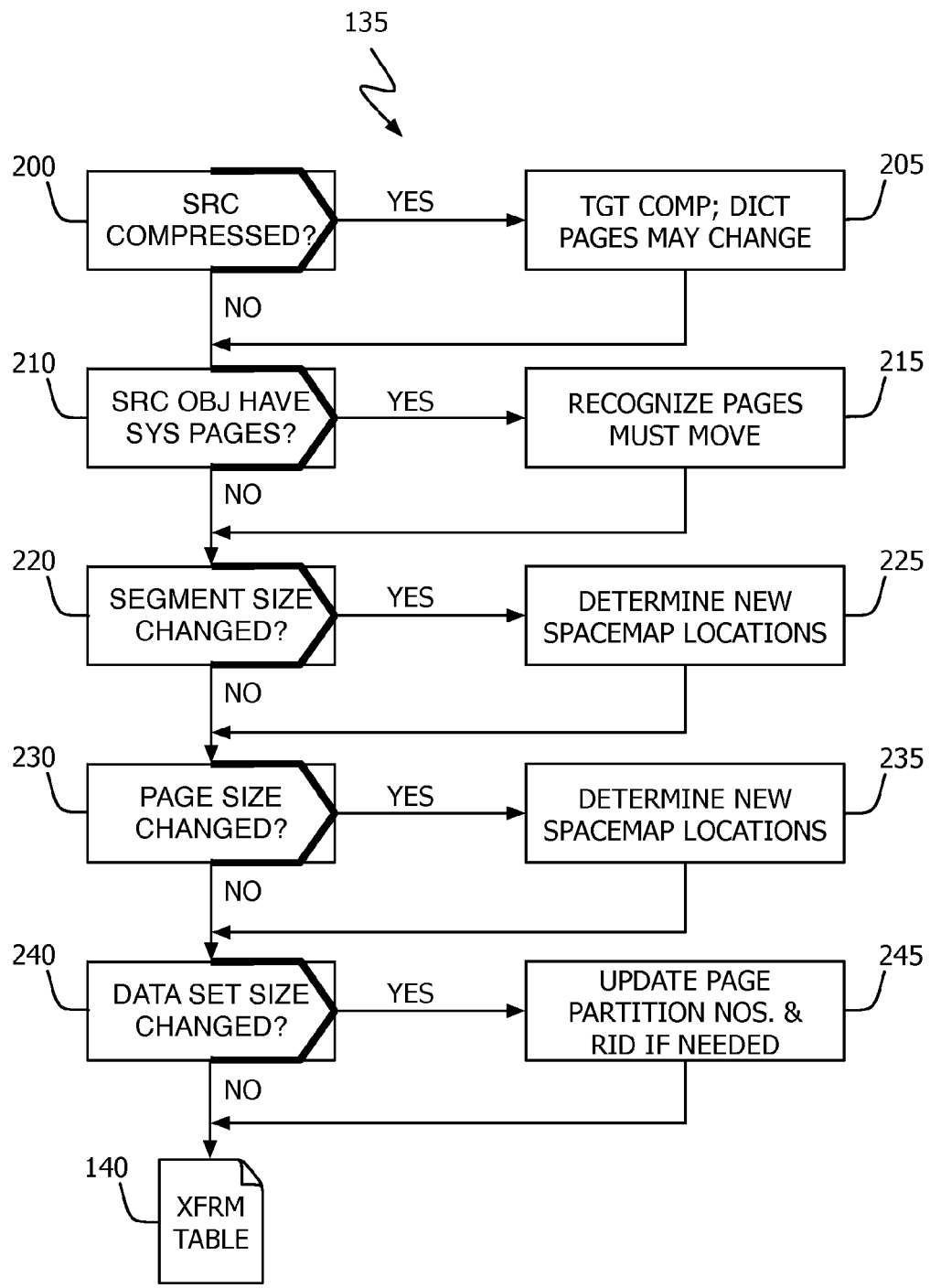
FIG. 2 shows, in flowchart form, a method to create a database object transformation table in accordance with one embodiment of the invention.

Referring to FIG. 2, operations associated with creating transformation table 140 are shown for one embodiment of the invention. For illustrative purposes, the implementation discussed herein is directed to translating a DB2 database object from a first (older) version to a second (newer) version. As an initial act, a check is made to determine if source object copy 115 (hereinafter referred to as the "source object" for ease of discussion) is compressed. If data in source object 115 is compressed (the "YES" prong of block 200), data in target object 150 must also be compressed and, if the segment size or page size in target object 150 is different from that of source object 115, the number of dictionary pages in target object 150 may also change (block 205).

Following the acts of block 205 or if data in source object 115 is not compressed (the "NO" prong of block 200), a check is made to determine if there are system pages within source object 115. One of ordinary skill in the art will recognize that in a DB2 RDBMS, system pages are generated in response to execution of an ALTER command. That is, where there is more than one version of a row and a column attribute has changed, system pages will exist for that object (e.g., source object 105). If source object 115 has system pages (the "YES" prong of block 210), it is noted that all system pages in source object 115 must be moved to the top of target object 150 (block 215). (It will be recognized that system pages may need to be placed after the target object's spacemap and compression dictionaries, if they exist).

A check is then made to determine if the segment size is being changed between source object 115 and target object 150. If the segment size is being changed (the "YES" prong of block 220), the location of spacemaps in source object 115 may need to be adjusted as they are moved into target object 150. These changes are recorded in transformation table 150 on an on-going basis, that is as they are encountered in source object 115 (block 225).

Following the acts of block 225, or if there is no segment size change between source object 115 and target object 150 (the "NO" prong of block 220), a further check is made to determine if there is a page size change between source object 115 and target object 150. If there is to be a change in page size (the "YES" prong of block 230), the location of spacemaps in source object 115 may need to be adjusted as they are moved into target object 150. These changes are recorded in transformation table 150 on an on-going basis, that is as they are encountered in source object 115 (block 235).

Following the acts of block 235, or if there is no page size change between source object 115 and target object 150 (the "NO" prong of block 230), a further check is made to determine if there is a data set size change between source object 115 and target object 150. If there is to be a change in data set size (the "YES" prong of block 240), for database objects having multiple data sets, their partition identifiers must be updated; this information is recorded in transformation table 140 (block 245). It will be recognized that in a DB2 RDBMS, a data set's partition identifier is a portion of the partition's page number. For example, in one embodiment a data set's page number comprises N bits, with b-bits representing the page number and (N-b) bits representing that page's partition identifier.

As acts in accordance with block 135 are performed, transformation table 140 is generated. In one embodiment this may be done in a computer system's internal or main memory. In another embodiment, transformation table 140 may be initiated in main memory, and then stored in secondary or direct access storage device (DASD) as needed. In yet another embodiment, transformation table 140 is not used. Instead, data from source object 105 (i.e., source object copy 115) is transformed directly to target object 150. However, by generating transformation table first, only that amount of main memory needed to store transformation table 140 is needed during this phase of operation 100. Separating operation 140 into transformation definition (blocks 110, 120, 130 and 135) and transformation implementation (block 145) phases not only reduces the amount of memory needed to implement transformation operation 100, it can also greatly reduce the amount of input-output (I/O) processing required by host or supporting computer system.

Figure 3:
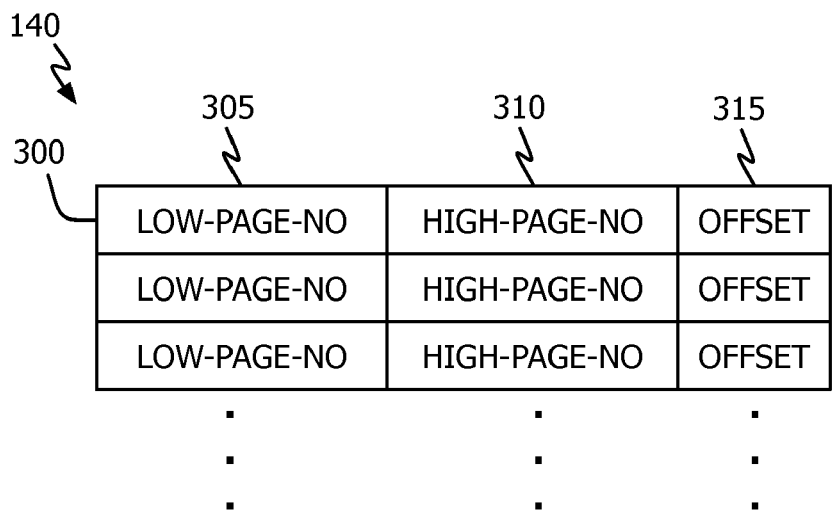
FIG. 3 shows a database transformation table in accordance with one embodiment of the invention.

In an embodiment directed to translating a DB2 table space, transformation table 140 may be structured as shown in FIG. 3. As operations in accordance with block 135 are performed, an entry in transformation table 140 is created for each group of entries in source object 115 that may be contiguously mapped to target object 150. As shown, in this particular embodiment each entry in transformation table 140 (e.g., entry 300) comprises three elements: low-page-no 305, high-page-no 310 and offset 315. Here, low-page-no 305 represents the lowest source object page number to which the transformation table entry applies and high-page-no 310 represents the highest source object page number to which the transformation table entry applies. Within this (inclusive) range, offset value 315 is used to adjust the source object's page number as it is transformed (i.e., moved) into target object 150.

Figure 4:
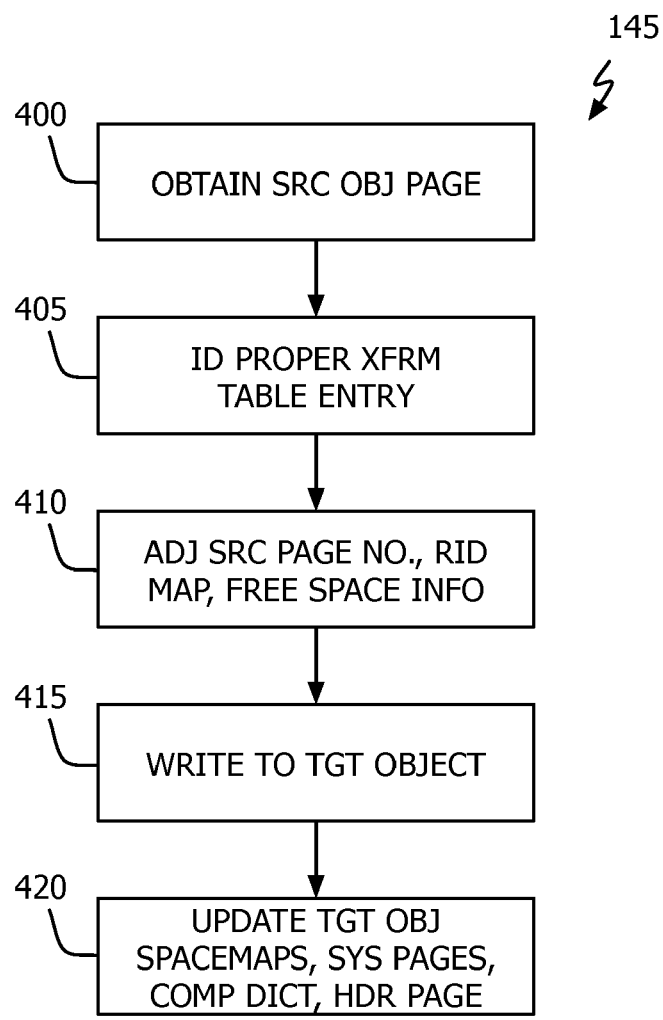
FIG. 4 shows, in flowchart form, a method to transform source object data into a target object in accordance with one embodiment of the invention.

Referring to FIG. 4, with construction of transformation table 140 complete, source object data may be transformed into target object 150. For each page in source object 115 (block 400), a check is made to determine which entry in transformation table 140 that particular source object page is associated with (block 405). As noted above, this is done by determining which transformation table entry encompasses the current source object's page number. Once the appropriate transformation table entry has been identified, the transformation table's offset entry 315 value is used to adjust the current page's number and, in a DB2 implementation, if the page size is being changed from source table space to target table space, the RID Map must be moved from the bottom of the source page to the bottom of the target page; in addition, the page's control information must be updated to reflect the amount of free space in the new (transformed) page (block 410). After the acts of block 410, the updated page may be written to target object 150 (block 415). As part of this write process, each page's overflow pointers (should they have any) may also be updated along with the object identifier (OBID) for each row. As previously noted, for multi-data set table spaces, adjusting a page's page number can also have the effect of adjusting the page's data set number. If this adjustment causes a data set boundary to be crossed, one of ordinary skill in the art will recognize that DB2 has well-defined rules as to what must be done. As a consequence, this circumstance will not be dealt with further in this disclosure. By way of example, if an entry in transformation table 140 has a low-page-no field 305 value of 0x00E3AA21, a high-page-no field 310 value of 0x00E3AFC0 and an offset field 315 value of 0x0000010E, then a source object page falling in this range (say page 0x00E3ABB4) will be placed into target object 150 at page:

Source Object Page No.+Offset

0x00E3ABB4+0x0000010E=0x00E3ABC2

In general, spacemap information for target object 150 is kept in system memory (e.g., buffer memory) and updated as source object data pages are moved to target object. In one embodiment, target object spacemap data is moved to target object 150 as each spacemap is complete (block 420). In another embodiment, all spacemap data for target object 150 is retained in system memory (to the extent possible or in secondary or DASD as needed) until all of source object 115's data has been moved into target object 150—then spacemap data is moved to target object 150 (block 420). As spacemap pages are written to target object 150, if the object's segment size has changed the spacemap page's control information must be updated and the segments reformatted to reflect the new size. In addition, if target object 150 is a DB2 partition by growth data set (or an equivalent style table space in a different RDBMS), compression dictionary information must be placed at the beginning of each new data set and the dictionary page's control information updated. This can be done when each new data set is created or after the complete table space has been written (block 420). Similarly, system pages (typically retained in system memory during page transformation operations) are also moved or written to target object 150 at the completion of moving all source object data pages (block 420). Further, if system pages exist, the first header page may be retained (in memory) and written at the same time as the system pages are written to target object 150. In addition, the header page may be updated to reflect the new attributes and system pages, when written to target object 150 may have their control information updated accordingly.

Figure 5:
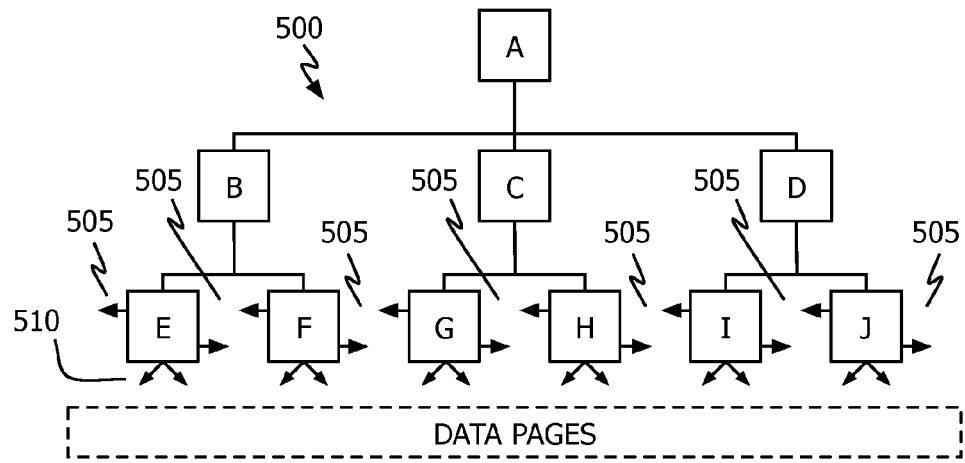
FIG. 5 illustrates a simplified database index structure.

Referring to FIG. 5, typical index structure 500 comprises a structure of nodes (labeled A→J), where the root node (labeled A) includes pointers to one or more children nodes (labeled B→D), all non-root and non-leaf nodes (labeled B→D) include pointers to their parent node (labeled A) and one or more child nodes (labeled E→J), and all leaf nodes include pointers to both previous and next index nodes (labeled 505) and table space data pages (labeled 510). It will be appreciated that index 500 shows a very simplified 3-level index. In practice, an index may comprise a large number of levels and span a very large number of data pages (e.g., gigabytes to terabytes of data).

Figure 6:
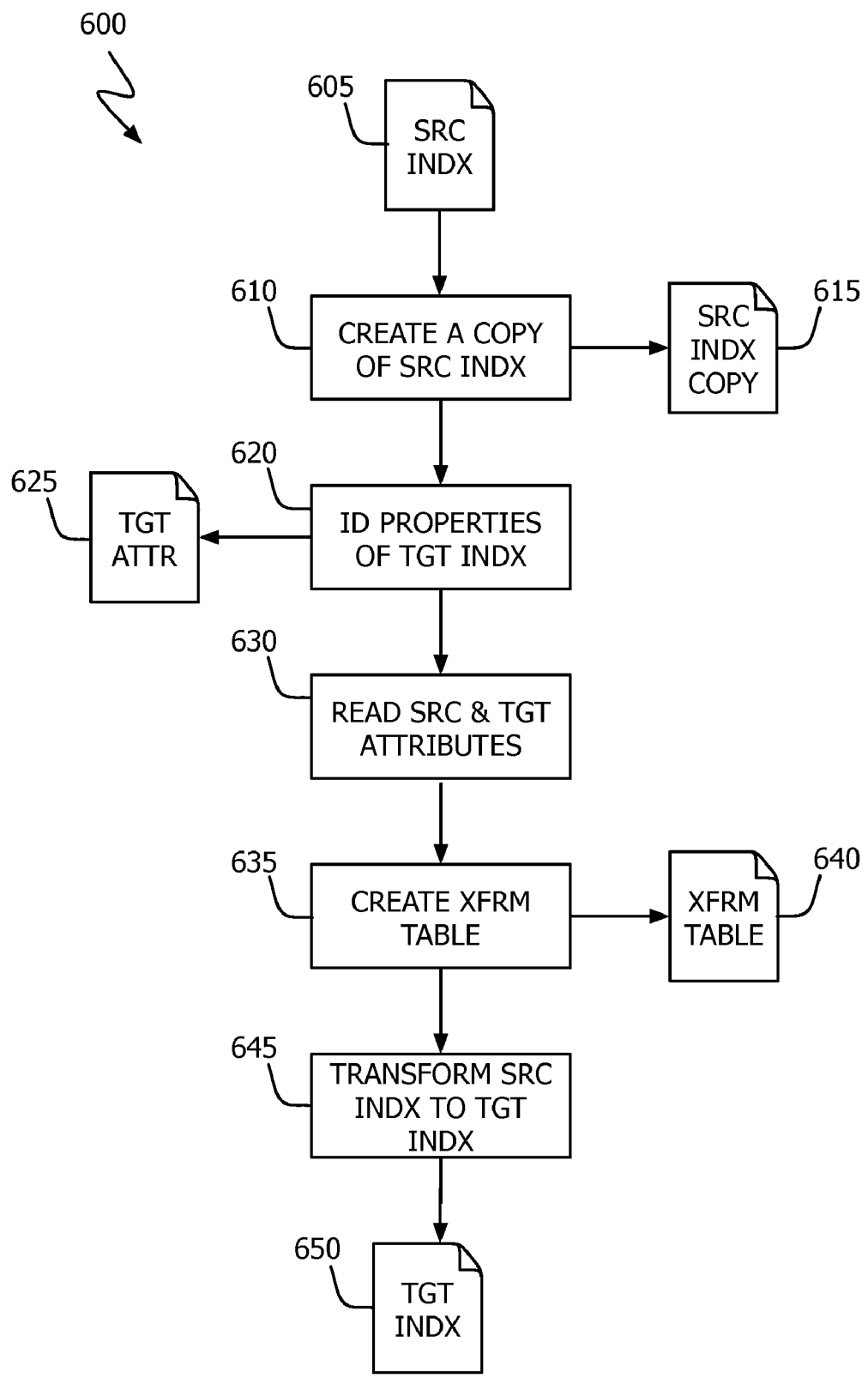
FIG. 6 shows, in flowchart form, a database index transformation method in accordance with one embodiment of the invention.

Referring to FIG. 6, database index transformation method 600 in accordance with one embodiment of the invention begins with source index 105 and creates a copy of the index (block 610) to produce source index copy 615. In general, source index copy 615 may be generated using any suitable database copy utility such as, for example, BMC COPY PLUS for DB2 or BMC RECOVER PLUS for DB2 both sold by BMC Software, Inc. or DB2 DSN1COPY. In a current embodiment, index object copy 615 is a consistent copy made in a manner that does not interrupt user access to index object 105. If user access to index object 605 during transformation operations is not mandatory, or some outage may be tolerated, or a consistent copy is not needed, other copy utilities may be used. Properties or attributes of the new index are then identified (block 620), with those attributes being recorded in a suitable manner (e.g., in target index schema 625). For example, a user may specify the schema for the target index from scratch—identifying each attribute by hand (through any suitable tool). Alternatively, a user may use a tool to duplicate the schema of source index 605, editing only those attributes they wish to change. In still another approach, a user could create a new index of the same type as source index 605, accepting the RDBMS' default schema values and edit those attributes they wish to change.

Source and target index attributes may then be read (block 630) to determine what changes need to be made to move index data from the source index schema to the target index schema and transformation table 640 generated (block 635). Once transformation table 640 is created, its entries may be used to move index data from source index copy 615 to target index 650 (block 645)—thereby implementing the transformation of data from source index schema to target index schema.

Figure 7:
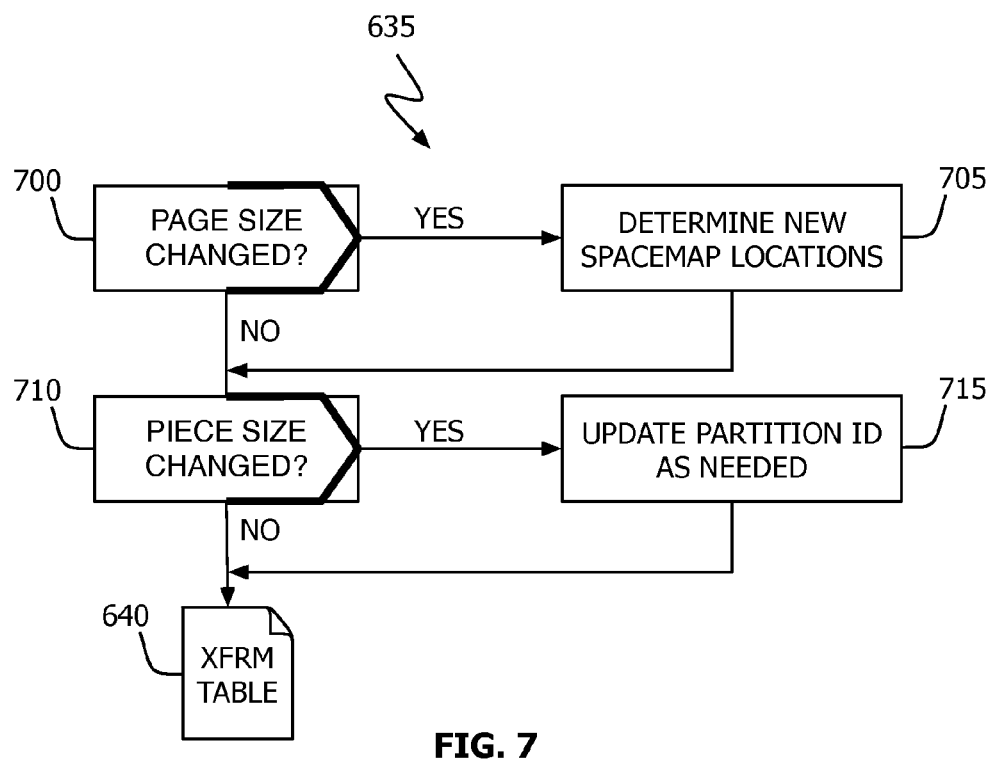
FIG. 7 shows, in flowchart form, a method to create a database index transformation table in accordance with one embodiment of the invention.

Referring to FIG. 7, operations associated with creating index transformation table 640 are shown for one embodiment of the invention. For illustrative purposes, the implementation discussed herein is directed to translating a DB2 index object. As an initial act, a check is made to determine if source index copy 615 (hereinafter referred to as the "source index" for ease of discussion) is having its page size changed. If the page size of the target index is to be different from source index 615 (the "YES" prong of block 700), the location of spacemaps in source index 615 may need to be adjusted as they are moved into target index 650. These changes are noted in transformation table 650 on an on-going basis, that is, as they are encountered in source index 615 (block 705).

Following the acts of block 705 or if the page size in source index 615 is not to be changed (the "NO" prong of block 700), a check is made to determine if the piece size of source index 615 is to be changed. (One of ordinary skill in the art will recognize that when referring to indices, the term "piece" is essentially equivalent to the term "data set" when referring to table space objects.) If the index piece size is to be changed (the "YES" prong of block 710), the partition bit portion of the source page's page number may have to be updated if the index is a partitioned index (see discussion above). If the index is a multi-piece non-partitioned index, only the first piece has a header page with the remaining pieces restricted to having only data. These adjustments are noted as an offset value and recorded in index transformation table 640. Following the acts of block 715, or if the indices piece size is not to be changed during transformation operation 600, index transformation table 640 has been created.

As described above with respect to data object transformation, illustrative index transformation table 640 may also be a table, each entry of which comprises three elements: a low-page-no, a high-page-no and an offset (see FIG. 3). Again, low-page-no represents the lowest source index page number to which the transformation table entry applies and high-page-no represents the highest source index page number to which the transformation table entry applies. Within this (inclusive) range, the offset value is used to adjust the source indices page number as it is transformed (i.e., moved) into target index 650.

Figure 8:
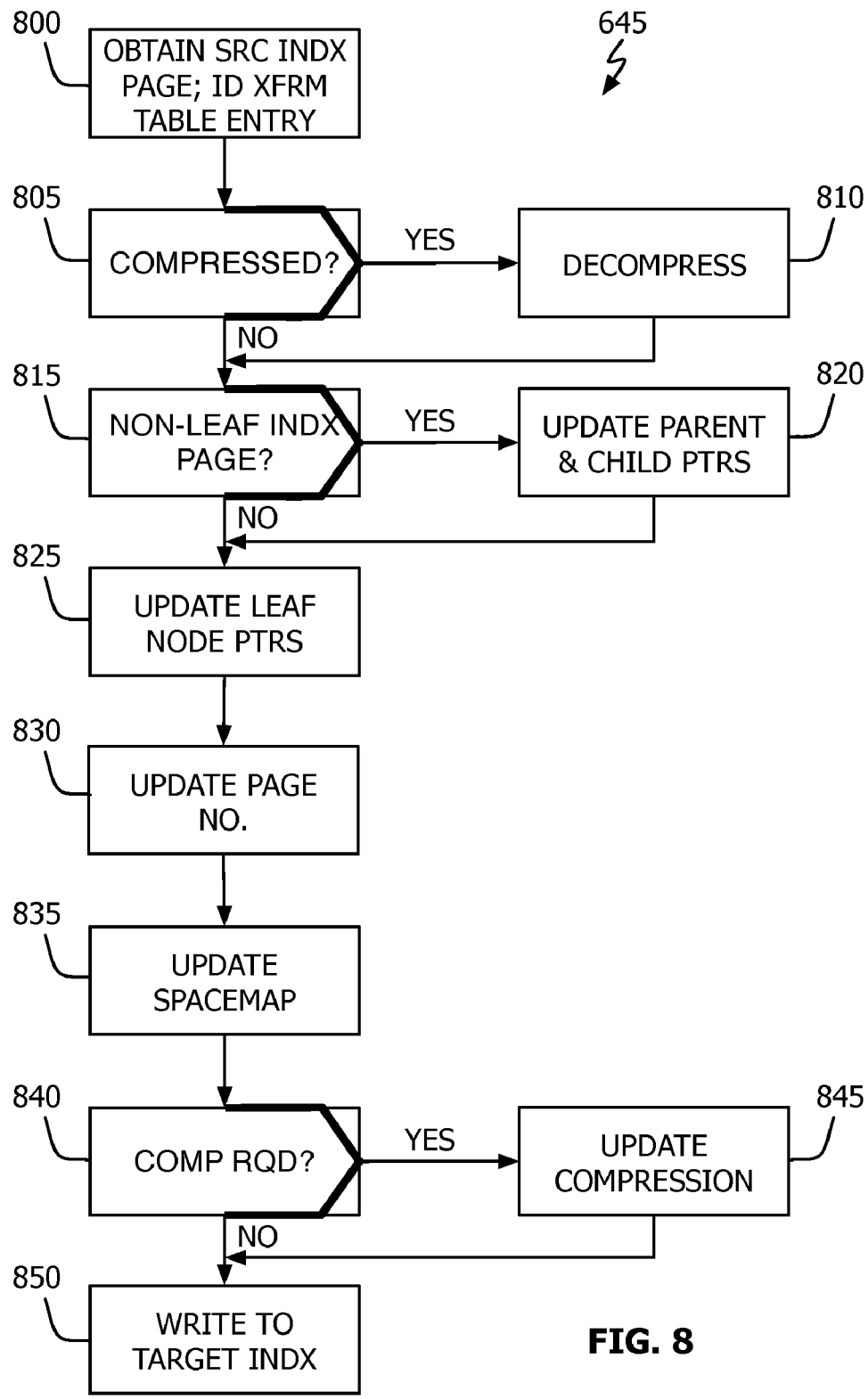
FIG. 8 shows, in flowchart form, a method to transform source index data into a target index in accordance with one embodiment of the invention.

Referring to FIG. 8, with construction of index transformation table 640 complete, source index data may be transformed into target index 650. First, a source index page is obtained and the appropriate entry in index transformation table 640 is identified (block 800). The "appropriate" transformation table entry is that entry whose low-page-no and high-page-no entries bound the page number of the source index page (see discussion above regarding transformation table 140).

If the source index page is compressed (the "YES" prong of block 805), the page is decompressed (block 810). If the source index page was not compressed (the "NO" prong of block 805) or following the acts of block 810, a check is made to determine if the source index page is a non-leaf page in the index structure. If the index page is a non-leaf page (the "YES" prong of block 815), pointers within the source index page to its parent and (one or more) children index nodes are updated using the transformation table entries offset value (block 820). If the source index page is a leaf (the "NO" prong of block 815), the source index page's pointers to next and previous index page pointers using index transformation table 640 and its pointers to table space data pages using table space transformation table 140 are updated using the transformation table entries offset value (block 825). In addition, for both leaf and non-leaf nodes (i.e., during the acts of blocks 820 and 825), in a DB2 implementation if the page size is being changed from source index 615 to target index 650, the RID or Key map must be moved from the bottom of the source indices page to the bottom of the target indices page and the control information must be updated to reflect the amount of free space in the new (transformed) index page.

Next, the source index page's page number is updated using the appropriate transformation table offset entry (block 830). As each source index page is transformed, the index piece header page and spacemap information is updated (block 835). In practice, spacemap information is generally retained in a computer system's working or main memory during transformation operations (e.g., process 600). If working memory is scarce or if other operating restrictions make it necessary however, portions of spacemap as well as transformation table 640 may be retained in secondary or DASD memory.

Following acts in accordance with block 835, a check is made to determine if compression is required before the transformed index page is written to target index 650. If compression is required (the "YES" prong of block 840), the page is compressed (block 845) before it is written to target index 650 (block 850). For example, if source index object 615 was compressed during the acts of block 810 and no change in the object's compression attribute is being made, each page must be recompressed before being written to target index 650. Likewise, if source index 615 was not compressed, but target index 650 is to be compressed, each page must be compressed before being written to target index 650. If compression is not required (the "NO" prong of block 840) or following the actions of block 845, the transformed source index object's data is written to target index 650 (block 850).

With respect to the acts of block 835, in one embodiment updated spacemap information may be written out to target index 650 after each source index piece is transformed. In another embodiment, updated spacemap information may be written out to target index 650 after all source index information has been transformed.

Figure 9:
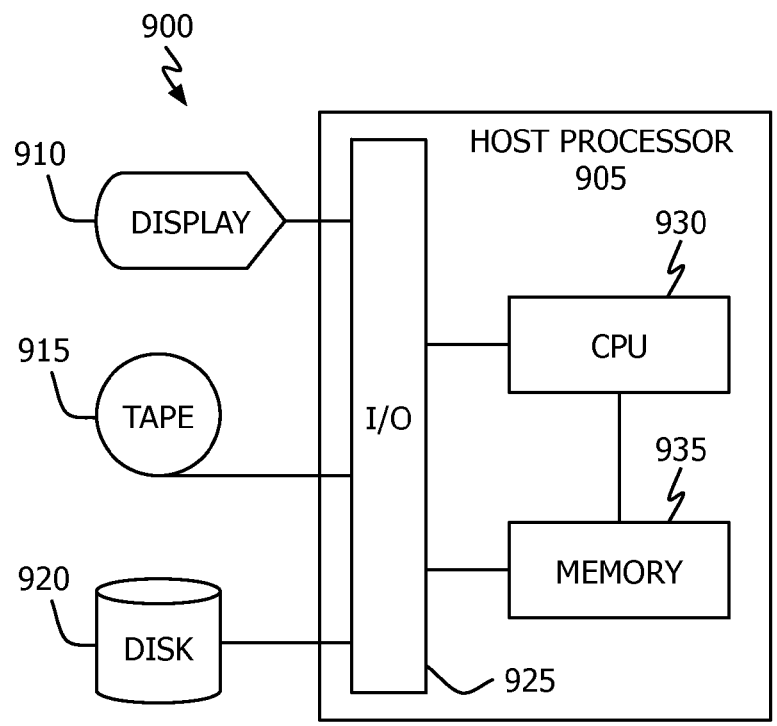
FIG. 9 shows, in block diagram form, a general purpose computer system in accordance with various embodiments of the invention.

Referring to FIG. 9, illustrative general purpose computer system 900 programmed to perform methods in accordance with the invention (e.g., those illustrated in FIGS. 1, 2, 4, 6, 7 and 8) includes host processor 905, display unit 910 and external storage units 915 (tape) and 920 (disk). Host processor 905 comprises input-output (I/O) unit 925, central processing unit 930 and memory 935. Display 910 represents both an output display unit and a keyboard input unit with, optionally, one or more, input devices such as a mouse. External storage unit 920 represents any form of non-volatile storage including, but not limited to, all forms of optical and magnetic storage elements including solid-state storage. Central processing unit 930 may include any programmable controller device including, for example, the Intel Core®, Pentium® and Celeron® processor families from Intel and the Cortex and ARM processor families from ARM. (INTEL CORE, PENTIUM and CELERON are registered trademarks of the Intel Corporation. CORTEX is a registered trademark of the ARM Limited Corporation. ARM is a registered trademark of the ARM Limited Company.) Memory 935 may include one or more memory modules and comprise random access memory (RAM), read only memory (ROM), programmable read only memory (PROM), programmable read-write memory and solid state memory. One of ordinary skill in the art will also recognize that CPU 930 typically includes some internal memory including, for example, cache memory.

Various changes in the materials, components, circuit elements, as well as in the details of the illustrated operational methods are possible without departing from the scope of the following claims. For instance, acts in accordance with FIGS. 1, 2, 4, 6, 7 and 8 may be performed by a programmable control device executing instructions organized into one or more modules (comprised of computer program code or instructions). A programmable control device may be a single computer processor (e.g., CPU 930), a plurality of computer processors coupled by a communications link or one or more special purpose processors (e.g., a digital signal processor, DSP). Such a programmable control device may be one element in a larger data processing system such as general purpose computer system 900. Storage media as embodied in storage devices such as 915, 920 and 935, as well as memory internal to CPU 930, suitable for tangibly embodying computer program instructions include, but are not limited to: magnetic disks (fixed, floppy, and removable) and tape; optical media such as CD-ROMs and digital video disks (DVDs); and semiconductor memory devices such as Electrically Programmable Read-Only Memory (EPROM), Electrically Erasable Programmable Read-Only Memory (EEPROM), Programmable Gate Arrays and flash devices.

Figure 10:
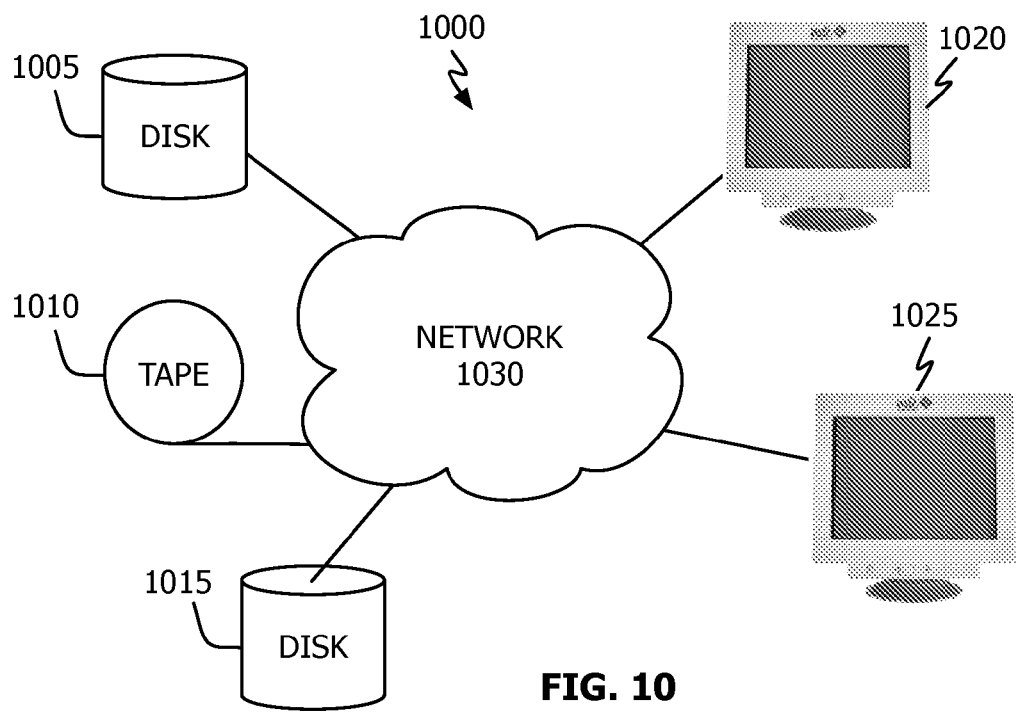
FIG. 10 shows, in block diagram form, a computer network in accordance with various embodiments of the invention.

In addition, computer system 900 could be one of a multiplicity of computer systems coupled through a computer network. As illustrated in FIG. 10, computer network 1000 comprises storage units 1005, 1010 and 1015 coupled to host computer systems (e.g., of the type illustrated in FIG. 9) 1020 and 1025 through network 1030—which could be one or more intranets, one or more extranets (e.g., the Internet) or a combination of both intra- and extranets. In network 1000, computer system 1020, for example, could include memory for retaining program modules for performing any of the methods illustrated in FIGS. 1, 2, 4, 6, 7 and 8. The actual database objects (e.g., tables spaces and/or index spaces) could be stored local to the computer system performing the method or distally at, for example, storage device 1005, 1010 or 1015.

Finally, while methods in accordance with FIGS. 1, 2, 4, 6, 7 and 8 have been discussed in the context of embodiments targeted for the DB2 database, the invention is not so limited. It will be recognized that while each implementation of a relational database may employ its own unique terms to concepts discussed here, all commercial relational database systems are based on the concepts of tables, rows, columns and attributes. Further, the concept of a "page-level" schema change is not unique to DB2 but is shared by all relational database systems such as, for example, Informix®, Ingres®, Oracle®, Sybase®. (INFORMIX is a registered trademark of International Business Machines Corporation. INGRES is a registered trademark of Ingres Corporation. ORACLE is a registered trademark of Oracle International Corporation. SYBASE is a registered trademark of Sybase, Inc.) Accordingly, the preceding descriptions and the following claims are not limited in scope to implementations of the DB2 relational database.

The invention claimed is:

1. A general purpose computer programmed to perform a database schema transformation method, the method comprising:
    identifying a first database object, the first database object having a plurality of pages and a first schema;
    specifying a second version of the first database object and referred to as a second database object, the second database object having a schema with at least one page-level attribute that is different from the first schema and referred to as a second schema;
    determining, for each page in the first database object, how each page-level attribute that is different between the first schema and the second schema will cause said page to change page-position when transformed from the first database object to the second database object;
    generating an entry in a transformation table for every one or more contiguous first database object pages determined to have a common page-position offset, wherein every page in the first database object is associated with a single entry in the transformation table; and
    transforming each page in the first database object into the second database.

2. The method of claim 1 wherein the act of identifying a first database object comprises:
    identifying a source database object; and
    copying the source database object to make the first database object.

3. The method of claim 2, wherein the act of copying comprises making a consistent copy of the source database object to make the first database object.

4. The method of claim 1, wherein the act of specifying a second version of the first database object having a schema with at least one page-level attribute that is different from the first schema comprises specifying one or more of the following page-level attributes: page size and row identifier size.

5. The method of claim 4, wherein the act of identifying a first database object comprises identifying a table space database object and the act of specifying a second version of the first database object having a schema with at least one page-level attribute that is different from the first schema comprises specifying one or more of the following page-level attributes: data set size and segment size.

6. The method of claim 4, wherein the act of identifying a first database object comprises identifying an index space database object and the act of specifying a second version of the first database object having a schema with at least one page-level attribute that is different from the first schema comprises specifying one or more of the following page-level attributes: piece size and compression attribute.

7. The method of claim 1, wherein the first database object comprises a nonpartitioned database object and the second database object comprises a partitioned database object.

8. The method of claim 1 wherein the act of generating an entry in a transformation table comprises:
    generating a low-page-number portion for each transformation table entry, the low-page-number portion being a value representing a first page number in the first database object;
    generating a high-page-number portion for each transformation table entry, the high-page-number portion being a value representing a second page number in the first database object; and
    generating an offset portion for each transformation table entry, the offset portion being a value.

9. The method of claim 8, further comprising storing the transformation, table entry in a memory.

10. The method of claim 9, wherein the act of storing the transformation table entry in a memory comprises storing the transformation table entry in a volatile memory.

11. The method of claim 8 wherein the act of transforming each page in the first database object into the second database object comprises:
    obtaining a page from the first database object, the page having a page number;
    selecting that transformation table entry whose low-page-number portion and high-page-number portion bounds the page number;
    updating the page number by adding the offset portion value to the page number; and
    inserting the page into the second database object at a location indicated by the updated page number.

12. The method of claim 11 wherein the act of transforming each page in the first database object into the second database object further comprises updating one or more of the following aspects of the page: row identifier and partition identifier.

13. The method of claim 11 wherein the act of transforming each page in the first database object into the second database object further comprises inserting one or more of the following into the second database object: a spacemap, a compression dictionary and a system page.

14. An article of manufacture comprising a program storage medium readable by a computer processor and embodying one or more instructions executable by the computer processor to perform a method in accordance with claim 1.

15. A computer network executing a method to transform a relational database object, the computer network comprising:
    a storage device for the non-volatile storage of a relational database object;
    a computer system communicatively coupled to the network and the storage device, the computer system having memory, the memory having stored therein program instructions for causing the computer system to perform the method of claim 1.

* * * * *

UNITED STATES PATENT AND TRADEMARK OFFICE
CERTIFICATE OF CORRECTION

PATENT NO. : 8,161,001 B2
APPLICATION NO. : 12/437471
DATED : April 17, 2012
INVENTOR(S) : Donna M. Di Carlo et al.

Page 1 of 1

It is certified that error appears in the above-identified patent and that said Letters Patent is hereby corrected as shown below:

On the Title Page
Item (75), in "Inventors", line 3, delete "Stanely" and insert -- Stanley --, therefor.

In column 9, line 47, in claim 1, delete "database." and insert -- database object in accordance with said page's associated transformation table entry. --, therefor.

In column 10, line 26, in claim 9, delete "transformation," and insert -- transformation --, therefor.

Signed and Sealed this
Nineteenth Day of June, 2012

David J. Kappos
*Director of the United States Patent and Trademark Office*